Aug. 1, 1933.　　　　　L. H. HEUER　　　　　1,920,862
SPRING ASSEMBLING MACHINE
Filed Jan. 2, 1932　　　　　6 Sheets-Sheet 2

Aug. 1, 1933.  L. H. HEUER  1,920,862
SPRING ASSEMBLING MACHINE
Filed Jan. 2, 1932  6 Sheets-Sheet 3

INVENTOR
Lawrence H. Heuer
BY
Chappell & Earl
ATTORNEYS

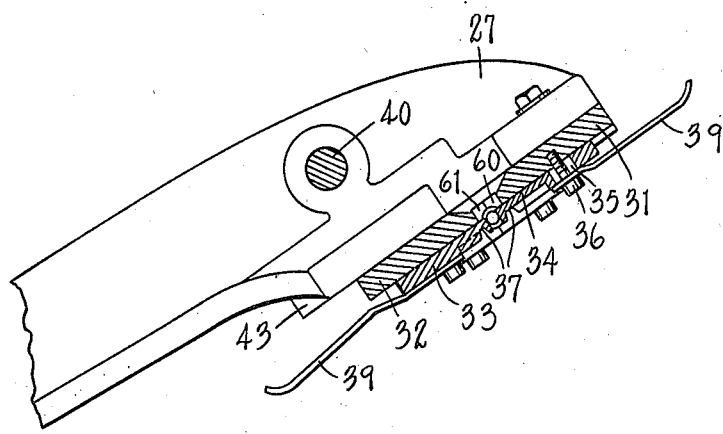
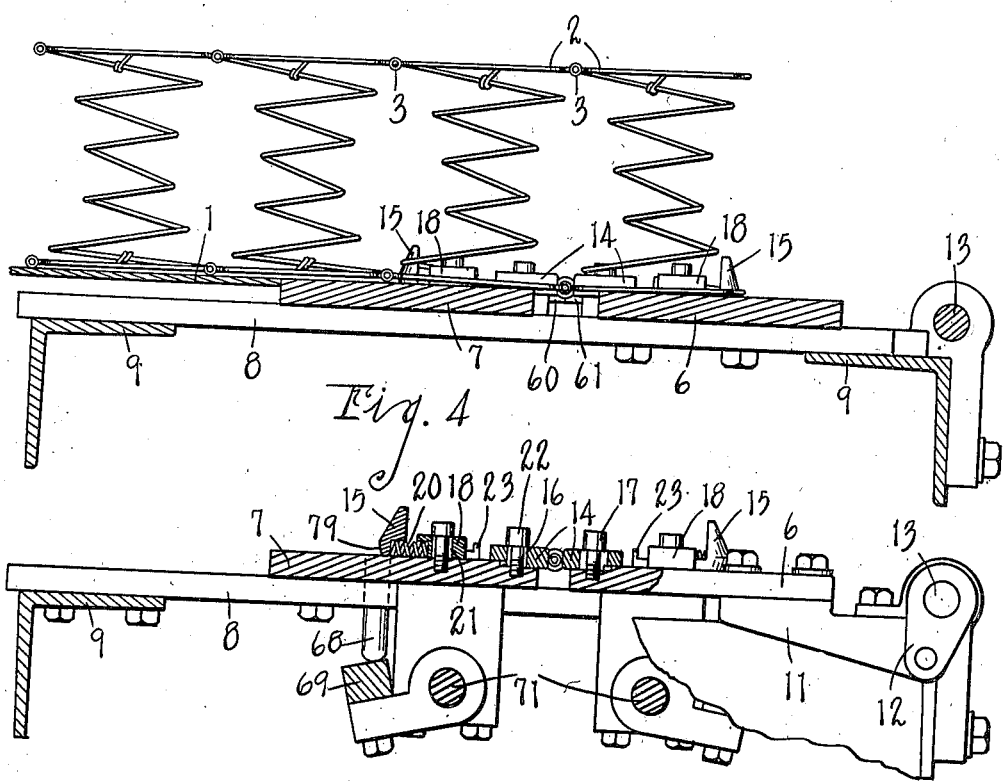
Fig. 4
Fig. 5

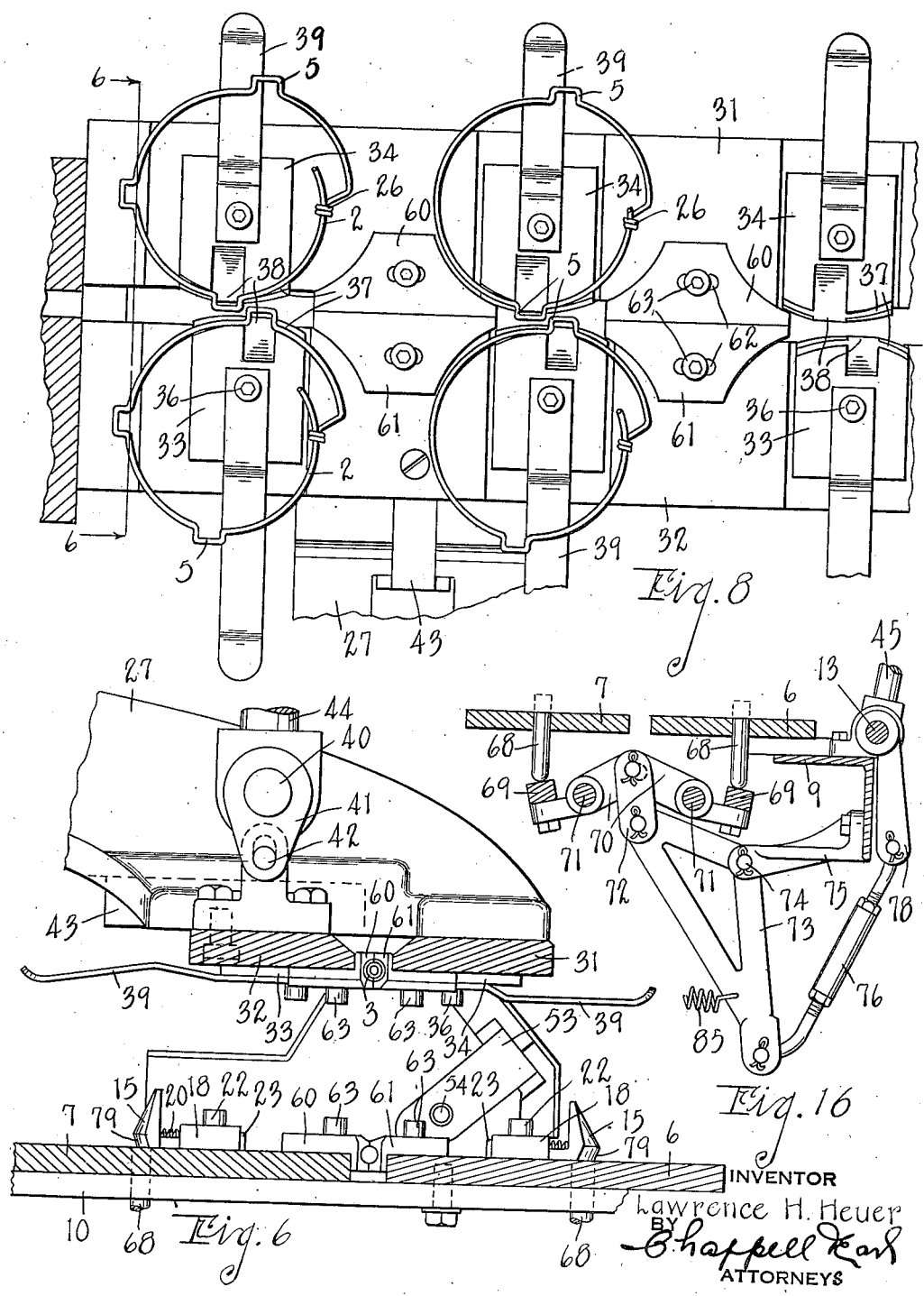

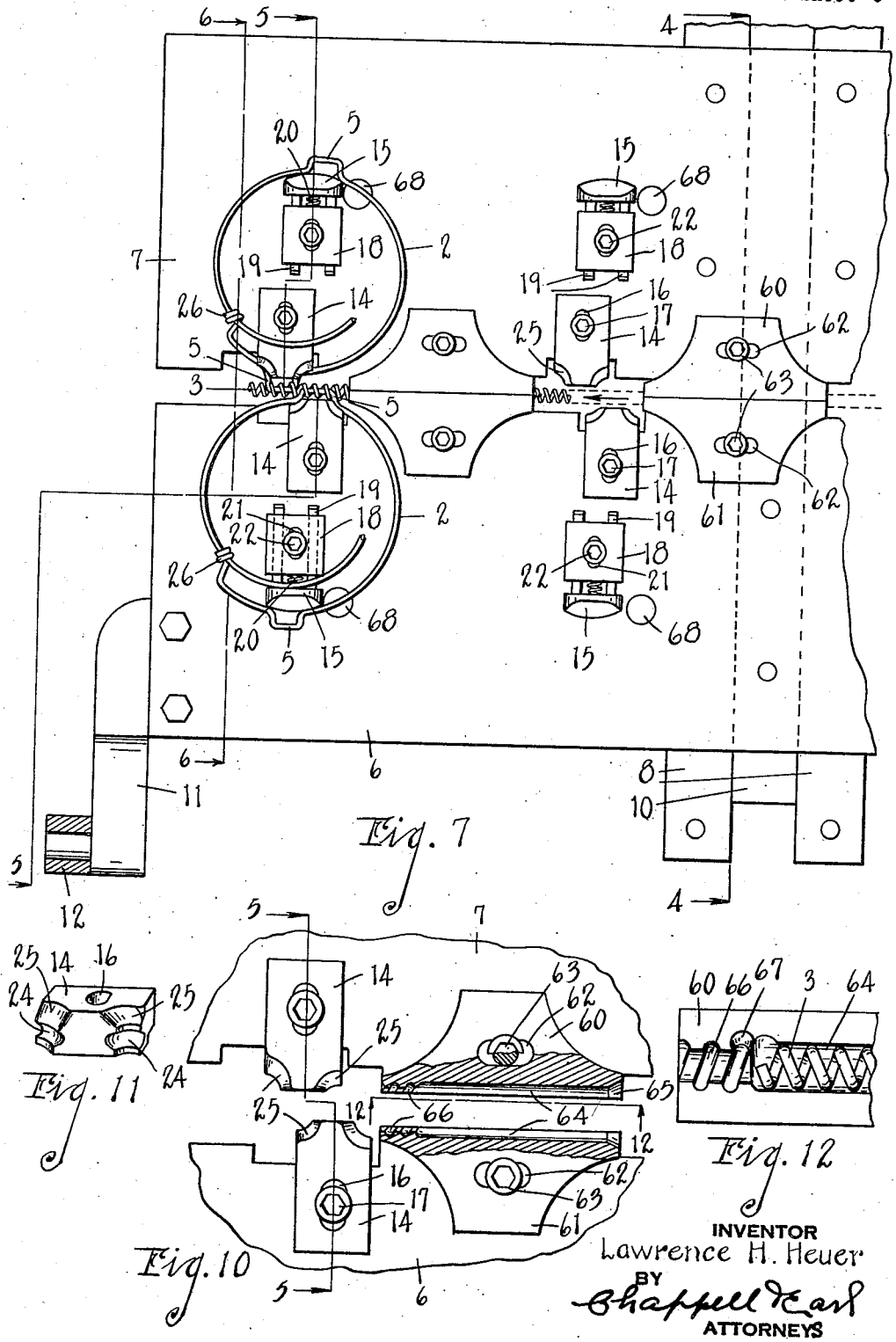

Patented Aug. 1, 1933

1,920,862

UNITED STATES PATENT OFFICE 1,920,862

SPRING ASSEMBLING MACHINE

Lawrence H. Heuer, Detroit, Mich., assignor to L. A. Young Spring and Wire Corporation, Detroit, Mich.

Application January 2, 1932. Serial No. 584,330

40 Claims. (Cl. 140—3)

The main objects of this invention are:

First, to provide a machine for assembling spring units adapted for mattress fillers, cushions, pillows and the like which is easily operated and of very large capacity.

Second, to provide a machine of this character which results in a very uniform product, even when operated by relatively unskilled workmen.

Third, to provide a spring assembling machine in which manual effort is reduced to a minimum and the machine at all times is under control of the operator.

Objects pertaining to details and economies of my invention will definitely appear from the description to follow. The invention is defined in the claims.

A structure which embodies the features of my invention is clearly illustrated in the accompanying drawings in which:

Fig. 4 is an enlarged vertical section on line 4—4 of Figs. 1 and 7 showing details of the spring holders.

Fig. 5 is an enlarged detail mainly in section on line 5—5 of Figs. 7 and 10 showing further details of the spring holders.

Fig. 6 is an enlarged vertical section on line 6—6 of Figs. 1, 3, 7 and 8 showing further details of the spring holder means.

Fig. 7 is an enlarged fragmentary plan view of the bottom spring holder means with a pair of springs arranged therein and illustrating the relation of the helical tie member thereto as it is engaged with the springs.

Fig. 8 is a fragmentary inverted view of the top spring holder means with the springs in operative relation thereto.

Fig. 9 is an enlarged fragmentary view partially in section on lines 9—9 of Figs. 3, 13 and 15 showing further details of the helical tie member guiding and feeding means and the relation thereof to the spring support, the parts being in open or spring releasing position.

Fig. 10 is a fragmentary plan view showing details of the bottom spring holding or chucking means and the tie member guides, the parts being shown in open position.

Fig. 11 is a perspective view of one of the spring holding jaws.

Fig. 12 is a fragmentary view on line 12—12 of Fig. 10 showing details of one of the tie member guides.

Fig. 13 is a detail section on line 13—13 of Fig. 3 showing details of the helical tie member drive means with the parts in open or retracted position.

Fig. 14 is a fragmentary section on line 14—14 of Fig. 3 showing the parts in driving position.

Fig. 15 is a fragmentary section on line 15—15 of Fig. 9 showing the parts in driving position by full lines and in open or retracted position by dotted lines.

Fig. 16 is an enlarged fragmentary section on line 16—16 of Fig. 1 showing details of the work ejecting means.

Figure 1:
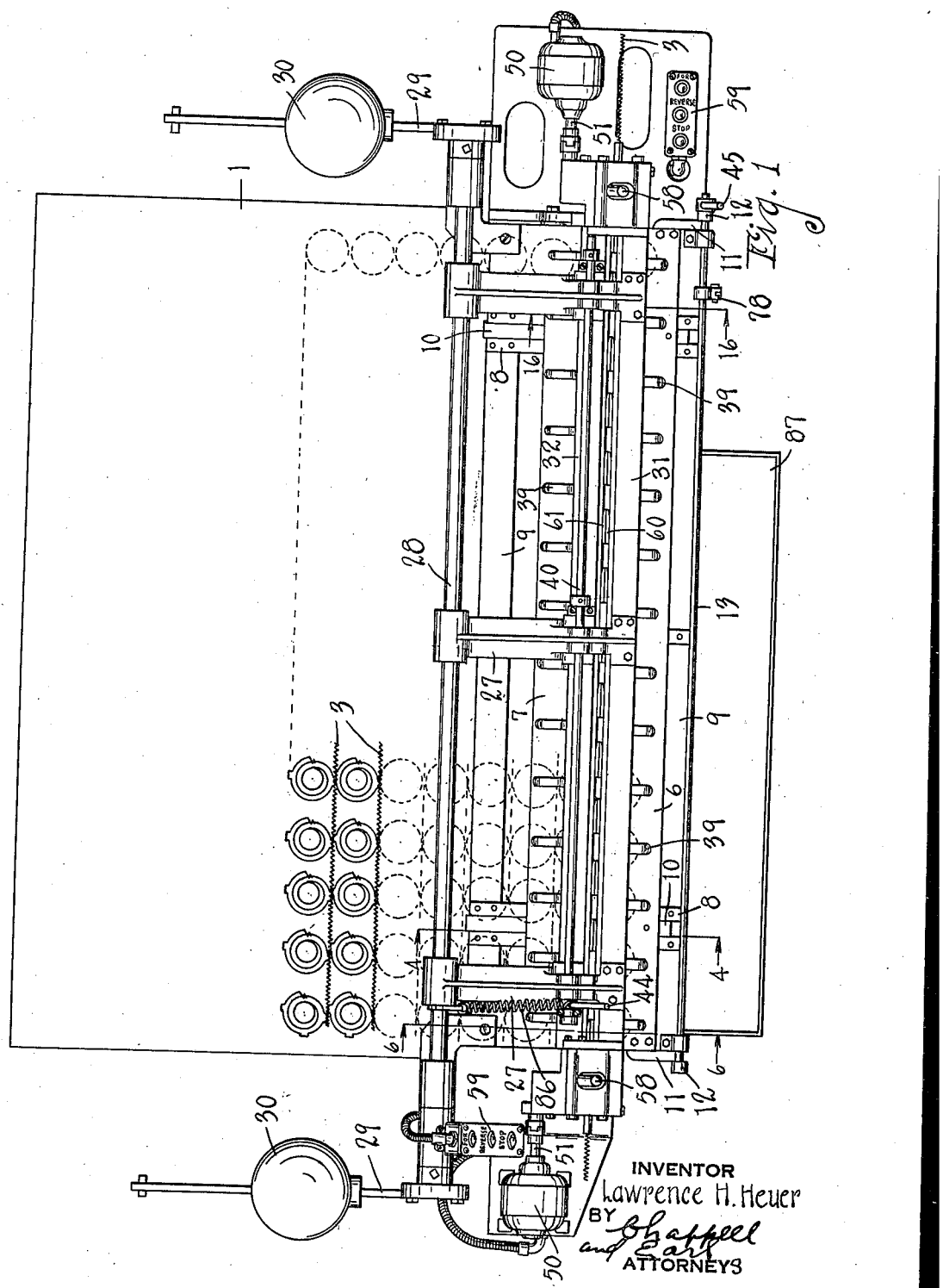
Fig. 1 is a plan view of my assembling machine with fragments of an assembled spring unit conventionally shown therein.
Figure 2:
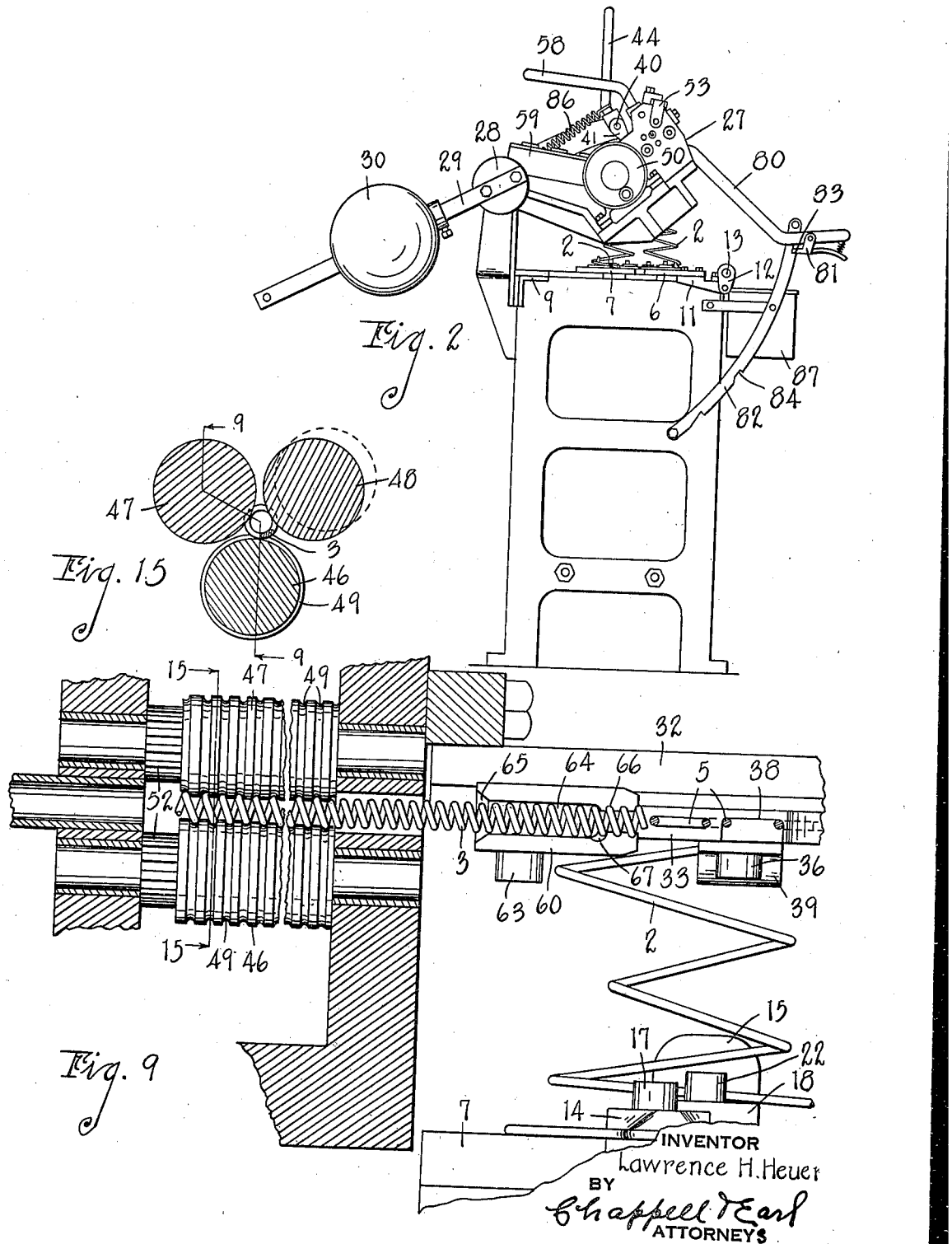
Fig. 2 is an end elevation of the machine looking from the left of Fig. 1 with work shown therein.

The embodiment of my invention illustrated in the accompanying drawings comprises a work table 1 provided with work holders adapted to support two rows of springs 2 in position to receive the helical coiled tie members 3 at the top and bottom thereof. The end coils of the springs 2 are provided with offsets 5, the bight portions of which are supported in alinement so that as the helical coils are advanced through the machine they encircle the alined bight portions of these offsets.

The supports comprise a pair of bed plates 6 and 7 mounted on ways 8 supported by the longitudinal rails 9 of the frame, the bed plate 6 being secured to the slides 10 slidably supported on the rails 9. The bed plate 6 is connected by the arms 11 to the arms 12 on the rockshaft 13. The connections for the arms 11 and 12 are such as to permit rocking movement of the rockshaft but I have not attempted to detail this.

The bed plates each carry a series of pairs of spring supporting or work holding jaws 14 and 15, these pairs of jaws being disposed in opposed relation. The jaws 14 are adjustably mounted on the jaw or bed plates, the jaws having slots 16 therein engaged by the screws 17. The jaws 15 are yieldingly supported on the holders 18 and have arms 19 slidable in the holders 18 and urged yieldingly outward by springs 20. The holders have slots 21 engaged by screws 22 so that the relative position of the jaws 14 and 15 can be readily adjusted to accommodate springs having end coils of different diameters. The arms 19 are provided with stops 23 on their ends which limit the outward movement of the jaws under the action of the springs 20.

The jaws 14 are shaped to support and locate the springs in a definite relation to each other and to facilitate the positioning of the springs relative to the jaws. This detail is best illustrated in Fig. 10.

It will be noted that the spring engaging end of the jaw or chuck member has oppositely inclined spring receiving grooves 24 adapted to receive the end coils of the springs adjacent the offsets therein, or, in reality, the shoulder portions formed by the offsets, thereby properly supporting the springs. The jaws are beveled at 25 to facilitate the positioning of the springs.

The adjacent jaws of the jaw plates are disposed in offset relation relative to each other so that the pairs of springs to be joined are properly positioned with the bights of their offsets in alinement as I have pointed out. The jaws 15 have tapered nose portions to be engaged between the end coil and the adjacent coil near the knots 26 of the springs so that the springs can be easily engaged with the jaws. The machine is adapted for the simultaneous connection of the top and bottom coils of springs of adjacent rows.

To properly support the upper ends of the springs I provide an upper holder consisting of swinging head members 27 mounted on the rockshaft 28 having arms 29 provided with adjustable counterbalances 30. These head members carry a pair of jaw plates 31 and 32, the jaw plates 31 in the embodiment illustrated being mounted on the head members in relatively fixed relation. The jaw plate 32 is slidable thereon to and from the jaw plate 31.

These jaw plates carry jaws 33 and 34, the jaws 34 being adjustably mounted on the jaw plate 31 by means of the slot 35 and the screws 36. These jaws are adapted to position and support the top end coils of the springs as shown in Fig. 8, and have positioning grooves 37 adapted to engage the end coils which open into recesses 38 alined with the offsets of the springs.

To prevent tilting of the springs and further hold them in proper relation, the jaws have rearwardly projecting spring fingers 39 which rest on the outer portions of the top coils of the springs, that is, the portions remote from the parts being joined.

Figure 3:
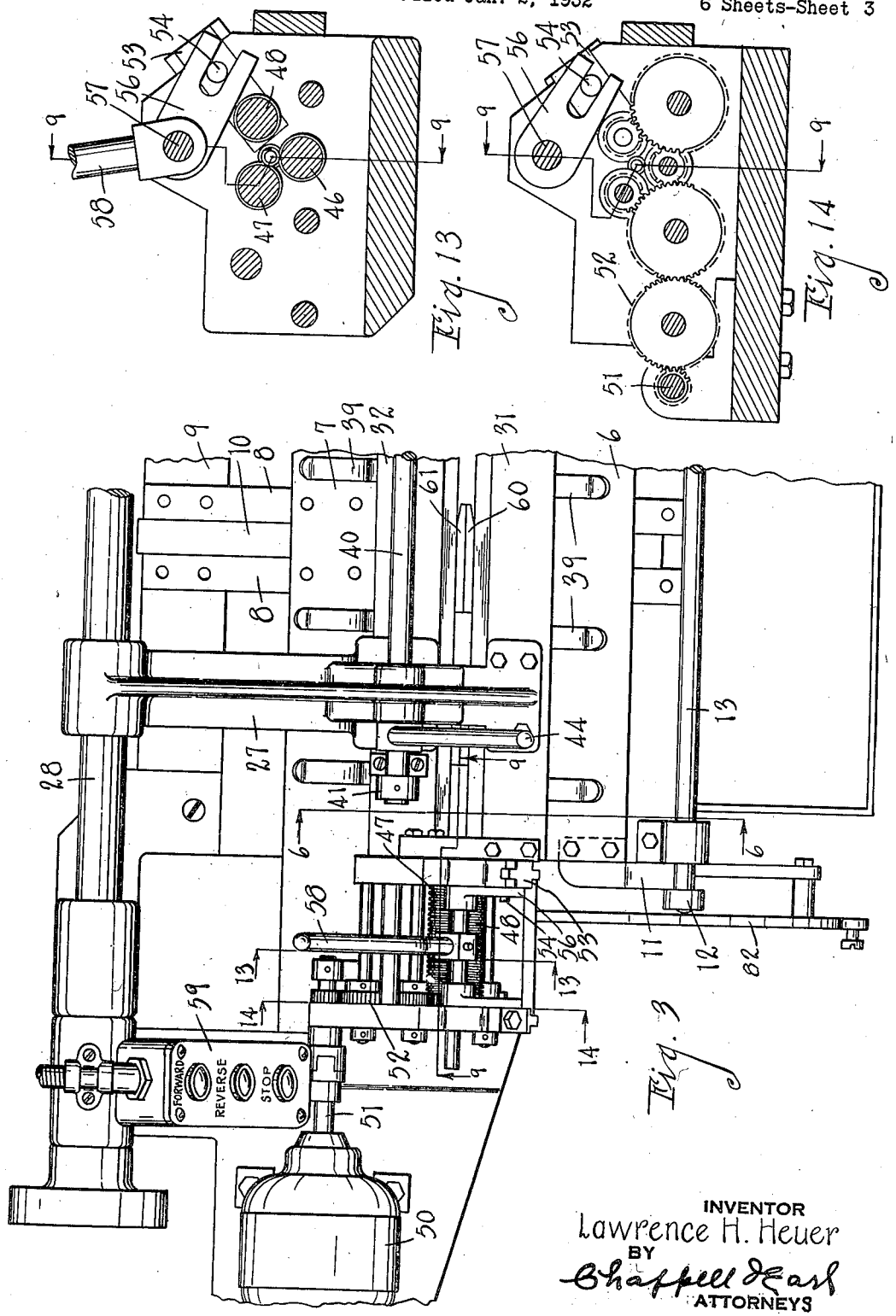
Fig. 3 is an enlarged fragmentary plan view showing details of the helical tie member feed and guiding means.

The movable jaw plate is slidably supported on the head members to be reciprocated by means of the rockshaft 40 carried by the head members and having arms 41 thereon slotted to engage the pins 42 on the slidable jaws. The jaws are carried by slides 43 on which the pins 42 are carried. The rockshaft 40 is provided with a hand lever 44, see Fig. 3. The rockshaft 13 is provided with a hand lever 45.

After two rows of springs have been placed in the machine and the jaws adjusted to support them in proper relation, the helical tie members 3 are rotated and advanced through the machine, which movement threads them into engagement with the offset portions of the springs. The mechanism for advancing the top and bottom helicals is duplicated, one being mounted at each end of the machine, so a description of one will suffice.

The feed means comprises peripherally grooved feed rollers 46, 47 and 48. The feed rollers 46 and 47 are mounted in a relatively fixed relation, their spacing, however, depending on the size of the helical to be used. The roller 48 is mounted for radical adjustment relative to the axis of the helical 3 and adjustment to and from the rollers 46 and 47 as is indicated by dotted lines in Fig. 15.

These feed rollers have peripheral uniformly spaced grooves 49, the grooves of these rollers, however, being disposed in stepped relation to each other; that is, they are not in alinement but are successively stepped so that when brought into engagement with the spiral or helical of the tie member 3 each coil thereof is engaged at three points, and when the rollers are rotated the coil is positively advanced and rotated.

Each feed device is provided with a driving motor 50, the shafts 51 of which are connected by a train of gears designated generally by the numeral 52, see Fig. 14, adapted to drive the grooved feed rollers in proper direction and speeds, at the same time permitting the retraction of the feed roller 48.

The bearings for this feed roller 48 are mounted on a slide 53 having a pin 54 thereon engaged by the slotted arm 56 on the rockshaft 57. This rockshaft has an operating lever 58 so that the roller 48 can be retracted, the helical tie member advanced into position to be engaged by the feed rollers, and the feed roller 48 adjusted to operative or work engaging position as shown in Fig. 15, its retracted position being shown in Fig. 13.

Each motor is provided with a control panel 59 having forward, reverse and stop buttoms thereon so that in the event it is desired to stop the motor at any point of advancement of the helical tie member that may be done, or the mechanism may be reversed to retract it should occasion require. It will be understood that these helicals or tie members are frequently of considerable length, particularly where the machine is designed or used for making mattress fillers, and inasmuch as they are quite flexible it is advantageous to provide further guide and feed means. In the embodiment illustrated I associate such means in operative relation to each pair of spring holders.

These guide and feed means consist of coacting members 60 and 61 which are mounted in opposed relation on the bottom bed or jaw plates and for longitudinal adjustment thereon by means of the slots 62 which are engaged with the clamping screws 63. These combined guide and feed members have opposed guide grooves 64 with flared mouth portions 65 to facilitate the entrance of the helical thereto and spirally grooved portions 66, these spiral grooves being so related to each other as to form in effect a continuous spiral. The result is that as the helicals are rotated and advanced in the guide portions 64 the ends of the helicals are brought into engagement with these spirally grooved portions and positively advanced into engagement with the adjacent springs. This positive advancement is of advantage as it prevents collapsing and kinking of the tie member should the end come into contact with a part of the springs to be connected.

To facilitate feeding and guiding the ends of the helicals into these guide and feed members the members 60, or the members toward which the helical rotates, has enlarged tapered mouth portions 67 which are effective in guiding the end of the helical tie members into the grooves. The relation of these parts is shown in Fig. 12. The top guide and feed members 60 and 61 are the same as those described except that they are disposed in reversed relation, owing to the fact that they are in inverted position when in use and the helical is fed from the opposite end of the machine. These feed members are of very decided advantage as they are quite effective in maintaining a uniform feed throughout the length of the tie member and also prevent collapsing, or they maintain a uniform pitch in the tie member coils.

To facilitate the release of the work I provide ejectors 68 which are mounted to reciprocate vertically through the bottom jaw plates, these being in the embodiment illustrated in the form of pins and their lower ends resting upon actuating and supporting bars 69 carried by the rockers 70 supported by shafts 71. The inner ends of these arms are connected by a link 72 to the lever 73 pivoted at 74 on the bracket 75, the lever being connected by the adjustable link 76 to the arm 78 on the rockshaft 13 so that when this rockshaft is actuated to open the jaws the ejectors are actuated to lift the connected springs from the jaws.

It should be noted that the jaws 15, previously referred to as having tapered nose portions, have undercut portions 79 into which the spring snaps and into which the springs are held by the tension of the coils so that the springs are effectively supported.

The ejectors are positioned to push the springs from these jaws, see the relation thereof in Figs. 5 and 7.

The upper jaw assembly carried by the head members is held in work engaging position by means of the arm 80 which is provided with a pawl 81 coacting with a segment 82 having substantially spaced notches 83 and 84. The bottom jaw plates and the parts operatively associated therewith as described are yieldingly urged to closed position by means of the spring 85, see Fig. 16, one end of which is connected to some fixed part of the frame and the other to the lever 73. The upper jaw plates are held yieldingly in jaw closing position by means of the spring 86, one end of which is connected to the lever 44 and the other to a fixed part, which, in the embodiment illustrated, consists of the rockshaft 28.

At the front of the machine is a tray 87 for the springs 2, these springs being ordinarily brought to the machine and arranged in nested condition so that they may be readily picked up and inserted in the holders.

In assembling a spring structure the first step is to arrange two rows of springs in the bottom jaws and swing the upper jaws down upon the holder. The head member is supported with the latch on the arm 40 in engagement with the keeper or teeth 83 of the segment 82. In this position the upper ends of the springs may be properly positioned in the upper jaws, and after being so positioned the head member is swung farther down to compress and locate the springs in position. The latch is then engaged with the keeper teeth 84.

The helicals are then engaged with the feed rolls by the manipulation described and the motors started. The helicals are thereby advanced, the bottom helical or tie member from one end of the machine and the upper from the other, and they are guided with the springs as described.

In the event that a helical or tie member cannot be fed into the machine its motor may be stopped or reversed to permit proper correction.

After the first pair of springs have been thus connected the upper jaws are swung to open position, the lower jaws released and the work simultaneously ejected. The connected rows of springs are then moved backward upon the work table, the front row being positioned in the rear set of jaw and a second row of springs set up on the front row of jaws, when the operation is repeated. One row of springs is added at each cycle of operation.

I have illustrated and described my invention in an embodiment which has proved very efficient not only in that it enables very rapid assembling of the spring units but with a minimum of effort on the part of the operators. I have not attempted to illustrate various modifications and adaptations which I contemplate as it is believed that this disclosure will enable those skilled in the art to embody or adapt my improvements as may be desired.

Having thus described my invention, what I claim as new and desire to secure by Letters Patent, is:

1. In a machine of the class described, the combination with a work table, of bottom jaw plates mounted thereon, one of said jaw plates being adjustable to and from the other, chucking jaws mounted on said jaw plates in opposed relation and adapted to support pairs of coiled springs having offsets in their end coils with offsets of their bottom coils in aligned relation, oscillating head members having upper jaw plates mounted thereon, one of said upper jaw plates being adjustable to and from the other, spring holding jaws mounted on said upper jaw plates and having downwardly facing grooves adapted to receive the upper end coils of springs mounted in said chucking jaws and support the pairs of springs with offsets of their upper end coils in aligned relation, said upper jaws having outwardly projecting fingers engaging the upper end coils of the springs opposite the point of their engagement in said upper jaw grooves, tie member guides comprising coacting members mounted on said jaw plates in opposed coacting relation and for longitudinal adjustment thereon relative to the jaws, said guide members having opposed longitudinal channels provided with flaring mouths and terminating in complemental spiral grooves at their ends adjacent the jaws, and feed means for rotating and advancing helical tie members through said guides and into engagement with the aligned offsets of the top and bottom end coils of the chucked springs.

2. In a machine of the class described, the combination with a work table, of bottom jaw plates mounted thereon, one of said jaw plates being adjustable to and from the other, chucking jaws mounted on said jaw plates in opposed relation and adapted to support pairs of coiled springs having offsets in their end coils with offsets of their bottom coils in aligned relation, oscillating head members having upper jaw plates mounted thereon, one of said upper jaw plates being adjustable to and from the other, spring holding jaws mounted on said upper jaw plates and having downwardly facing grooves adapted to receive the upper end coils of springs mounted in said chucking jaws and support the pairs of springs with offsets of their upper end coils in aligned relation, said upper jaws having outwardly projecting fingers engaging the upper end coils of the springs opposite the point of their engagement in said upper jaw grooves, and feed means for rotating and advancing helical tie members into engagement with the aligned offsets of the top and bottom end coils of the chucked springs.

3. In a machine of the class described, the combination with a work table, of bottom jaw plates mounted thereon, one of said jaw plates being adjustable to and from the other, chucking jaws mounted on said jaw plates in opposed relation and adapted to support pairs of coiled springs having offsets in their end coils with offsets of their bottom coils in aligned relation, oscillating head members having upper jaw plates mounted thereon, one of said upper jaw plates being adjustable to and from the other, spring holding jaws mounted on said upper jaw plates and having downwardly facing grooves adapted to receive the upper end coils of springs mounted in said chucking jaws and support the pairs of springs with offsets of their upper end coils in aligned relation, said upper jaws having outwardly projecting fingers engaging the upper end coils of the springs opposite the point of their engagement in said upper jaw grooves, tie member guides comprising coacting members mounted on said jaw plates in opposed coacting relation and for longitudinal adjustment thereon relative to the jaws, said guide members having opposed longitudinal channels provided with flaring mouths and terminating in complemental spiral grooves at their ends adjacent the jaws, work ejectors reciprocatingly mounted in the bottom jaw plates, operating connections for said work ejectors and the adjustable bottom jaw plate, and feed means for rotating and advancing helical tie members through said guides and into engagement with the aligned offsets of the top and bottom end coils of the chucked springs.

4. In a machine of the class described, the combination with a work table, of bottom jaw plates mounted thereon, one of said jaw plates being adjustable to and from the other, chucking jaws mounted on said jaw plates in opposed relation and adapted to support pairs of coiled springs having offsets in their end coils with offsets of their bottom coils in aligned relation, oscillating head members having upper jaw plates mounted thereon, one of said upper jaw plates being adjustable to and from the other, spring holding jaws mounted on said upper jaw plates and having downwardly facing grooves adapted to receive the upper end coils of springs mounted in said chucking jaws and support the pairs of springs with offsets of their upper end coils in aligned relation, said upper jaws having outwardly projecting fingers engaging the upper end coils of the springs opposite the point of their engagement in said upper jaw grooves, tie member guides comprising coacting members mounted on said jaw plates in opposed coacting relation and for longitudinal adjustment thereon relative to the jaws, said guide members having opposed longitudinal channels provided with flaring mouths and terminating in complemental spiral grooves at their ends adjacent the jaws, work ejectors reciprocatingly mounted in the bottom jaw plates, operating connections for said work ejectors and the adjustable bottom jaw plate, means for supporting the oscillating head members in a position to facilitate engagement of the work therewith and also in work clamping position, and feed means for rotating and advancing helical tie members through said guides and into engagement with the aligned offsets of the top and bottom end coils of the chucked springs.

5. In a machine of the class described, the combination with a work table, of bottom jaw plates mounted thereon, one of said jaw plates being adjustable to and from the other, chucking jaws mounted on said jaw plates in opposed relation and adapted to support pairs of coiled springs having offsets in their end coils with offsets of their bottom coils in aligned relation, oscillating head members having upper jaw plates mounted thereon, one of said upper jaw plates being adjustable to and from the other, spring holding jaws mounted on said upper jaw plates and having downwardly facing grooves adapted to receive the upper end coils of springs mounted in said chucking jaws and support the pairs of springs with offsets of their upper end coils in aligned relation, said upper jaws having outwardly projecting fingers engaging the upper end coils of the springs opposite the point of their engagement in said upper jaw grooves, work ejectors reciprocatingly mounted in the bottom jaw plates, operating connections for said work ejectors and the adjustable bottom jaw plate, and feed means for rotating and advancing helical tie members into engagement with the aligned offsets of the top and bottom end coils of the chucked springs.

6. In a machine of the class described, the combination with a work table, of bottom jaw plates mounted thereon, one of said jaw plates being adjustable to and from the other, chucking jaws mounted on said jaw plates in opposed relation and adapted to support pairs of coiled springs having offsets in their end coils with offsets of their bottom coils in aligned relation, oscillating head members having upper jaw plates mounted thereon, one of said upper jaw plates being adjustable to and from the other, spring holding jaws mounted on said upper jaw plates and having downwardly facing grooves adapted to receive the upper end coils of springs mounted in said chucking jaws and support the pairs of springs with offsets of their upper end coils in aligned relation, said upper jaws having outwardly projecting fingers engaging the upper end coils of the springs opposite the point of their engagement in said upper jaw grooves, work ejectors reciprocatingly mounted in the bottom jaw plates, operating connections for said work ejectors and the adjustable bottom jaw plate, means for supporting the oscillating head members in a position to facilitate engagement of the work therewith and also in work clamping position, and feed means for rotating and advancing helical tie members into engagement with the aligned offsets of the top and bottom end coils of the chucked springs.

7. In a machine of the class described, the combination with a work table, of bottom jaw plates mounted thereon, one of said jaw plates being adjustable to and from the other, chucking jaws mounted on said jaw plates and adapted to support coiled springs with parts of their bottom end coils in aligned relation, oscillating head members having upper jaw plates mounted thereon, one of said upper jaw plates being adjustable to and from the other, spring holding jaws mounted on said upper jaw plates adapted to receive the upper end coils of spings mounted in said chucking jaws and support the springs with parts of their upper end coils in aligned relation, tie member guides comprising coacting members mounted on said jaw plates in opposed relation, said guide members having opposed longitudinal channels terminating in complemental spiral grooves at their ends adjacent the jaws, and feed means for rotating and advancing helical tie members through said guides and into engagement with the aligned parts of the chucked springs.

8. In a machine of the class described, the combination with a work table, of bottom jaw plates mounted thereon, one of said jaw plates being adjustable to and from the other, chucking jaws mounted on said jaw plates and adapted to support coiled springs with parts of their bottom end coils in aligned relation, oscillating head members having upper jaw plates mounted thereon, one of said upper jaw plates being adjustable to and from the other, spring holding jaws mounted on said upper jaw plates adapted to receive the upper end coils of springs mounted in said chucking jaws and support the springs with parts of their upper end coils in aligned relation, and feed means for rotating and advancing helical tie members through said guides and into engagement with the aligned parts of the chucked springs.

9. In a machine of the class described, the combination with a work table, of bottom jaw plates mounted thereon, one of said jaw plates being adjustable to and from the other, chucking jaws mounted on said jaw plates and adapted to support coiled springs with parts of their bottom end coils in aligned relation, oscillating head members having upper jaw plates mounted thereon, one of said upper jaw plates being adjustable to and from the other, spring holding jaws mounted on said upper jaw plates adapted to receive the upper end coils of springs mounted in said chucking jaws and support the springs with parts of their upper end coils in aligned relation, work ejectors, operating connections for said work ejectors and the adjustable bottom jaw plate, and feed means for rotating and advancing helical tie members through said guides and into engagement with the aligned parts of the chucked springs.

10. In a machine of the class described, the combination with a work table, of bottom jaw plates mounted thereon, one of said jaw plates being adjustable to and from the other, chucking jaws mounted on said jaw plates and adapted to support coiled springs with parts of their bottom end coils in aligned relation, oscillating head members having upper jaw plates mounted thereon, one of said upper jaw plates being adjustable to and from the other, spring holding jaws mounted on said upper jaw plates adapted to receive the upper end coils of springs mounted in said chucking jaws and support the springs with parts of their upper end coils in aligned relation, work ejectors, operating connections for said work ejectors and the adjustable bottom jaw plate, means for supporting the oscillating head members in a position to facilitate engagement of the work therewith and also in work clamping position, and feed means for rotating and advancing helical tie members through said guides and into engagement with the aligned parts of the chucked springs.

11. In a machine of the class described, the combination with a work table, of bottom jaw plates mounted thereon, one of said jaw plates being adjustable to and from the other, work chucks on said jaw plates adapted to support springs to be assembled, upper jaw plates mounted for oscillating movement to and from the lower jaw plates, one of said upper jaw plates being adjustable relative to the other, spring holding jaws on said upper jaw plates adapted to support the upper end coils of the chucked springs, tie member guides comprising coacting members mounted on said jaw plates in opposed relation, said guides having spiral grooves at their ends adjacent the chucked springs, and feed means for rotating and simultaneously advancing helical tie members through said guides and into engagement with the springs to be connected.

12. In a machine of the class described, the combination with a work table, of bottom jaw plates mounted thereon, one of said jaw plates being adjustable to and from the other, work chucks on said jaw plates adapted to support springs to be assembled, upper jaw plates mounted for oscillating movement to and from the lower jaw plates, one of said upper jaw plates being adjustable relative to the other, spring holding jaws on said upper jaw plates adapted to support the upper end coils of the chucked springs, means for supporting the upper jaw plates in position to facilitate the engagement of the work with the upper jaws and also in work clamping position, and feed means for rotating and simultaneously advancing helical tie members through said guides and into engagement with the springs to be connected.

13. In a machine of the class described, the combination with a work table, of bottom jaw plates mounted thereon, one of said jaw plates being adjustable to and from the other, work chucks on said jaw plates adapted to support springs to be assembled, upper jaw plates mounted for oscillating movement to and from the lower jaw plates, one of said upper jaw plates being adjustable relative to the other, spring holding jaws on said upper jaw plates adapted to support the upper end coils of the chucked springs, means for ejecting the work from the chucking jaws, operating connections therefor to the adjustable bottom jaw plate, and feed means for rotating and simultaneously advancing helical tie members through said guides and into engagement with the springs to be connected.

14. In a machine of the class described, the combination with a work table, of bottom jaw plates mounted thereon, one of said jaw plates being adjustable to and from the other, work chucks on said jaw plates adapted to support springs to be assembled, upper jaw plates mounted for oscillating movement to and from the lower jaw plates, one of said upper jaw plates being adjustable relative to the other, spring holding jaws on said upper jaw plates adapted to support the upper end coils of the chucked springs, means for ejecting the work from the chucking jaws, operating connections therefor to the adjustable bottom jaw plate, means for supporting the upper jaw plates in position to facilitate the engagement of the work with the upper jaws and also in work clamping position, and feed means for rotating and simultaneously advancing helical tie members through said guides and into engagement with the springs to be connected.

15. In a machine of the class described, the combination with a work table, of chucking jaws adapted to support pairs of coiled springs having offsets in their end coils with offsets of their bottom coils in aligned relation, upper spring holding jaws having downwardly facing grooves adapted to receive the upper end coils of springs mounted in said chucking jaws and support the pairs of springs with offsets of their upper end coils in aligned relation, said upper jaws having outwardly projecting fingers engaging the upper end coils of the springs opposite the point of their engagement in said upper jaw grooves, tie member guides provided with flaring mouths and terminating in spiral grooves at their ends adjacent the jaws, and feed means positioned at opposite ends of the work table for rotating and advancing helical tie members through said guides and into engagement with the aligned offsets of the top and bottom end coils of the chucked springs, each feed means comprising a plurality of feed rollers having peripheral annular grooves therein, the grooves of said rolls being arranged in stepped relation, one of said rolls being adjustable relative to the others to facilitate the positioning of the work therein.

16. In a machine of the class described, the combination with a work table, of chucking jaws adapted to support pairs of coiled springs having offsets in their end coils with offsets of their bottom coils in aligned relation, upper spring holding jaws having downwardly facing grooves adapted to receive the upper end coils of springs mounted in said chucking jaws and support the pairs of springs with offsets of their upper end coils in aligned relation, said upper jaws having outwardly projecting fingers engaging the upper end coils of the springs opposite the point of their engagement in said upper jaw grooves, tie member guides provided with flaring mouths and terminating in spiral grooves at their ends adjacent the jaws, and feed means for rotating and advancing helical tie members through said guides and into engagement with the aligned offsets of the top and bottom end coils of the chucked springs.

17. In a machine of the class described, the combination with a work table, of chucking jaws adapted to support pairs of coiled springs having offsets in their end coils with offsets of their bottom coils in aligned relation, upper spring holding jaws having downwardly facing grooves adapted to receive the upper end coils of springs mounted in said chucking jaws and support the pairs of springs with offsets of their upper end coils in aligned relation, said upper jaws having outwardly projecting fingers engaging the upper end coils of the springs opposite the point of their engagement in said upper jaw grooves, and feed means positioned at opposite ends of the work table for rotating and advancing helical tie members into engagement with the aligned offsets of the top and bottom end coils of the chucked springs, each feed means comprising a plurality of feed rollers having peripheral annular grooves therein, the grooves of said rolls being arranged in stepped relation, one of said rolls being adjustable relative to the others to facilitate the positioning of the work therein.

18. In a machine of the class described, the combination with a work table, of chucking jaws adapted to support coiled springs with portions of their bottom coils in fixed relation, upper spring holding jaws engaging and supporting the upper end coils of springs mounted in said chucking jaws with parts thereof in aligned relation, tie member guides having spiral grooves at their ends adjacent the jaws, and feed means for rotating and advancing helical tie members through said guides and into engagement with the top and bottom end coils of the chucked springs, each feed means comprising a plurality of feed rollers having peripheral annular grooves therein, the grooves of said rolls being arranged in stepped relation, one of said rolls being adjustable relative to the others to facilitate the positioning of the work therein.

19. In a machine of the class described, the combination with a work table, of chucking jaws adapted to support coiled springs with portions of their bottom coils in fixed relation, upper spring holding jaws engaging and supporting the upper end coils of springs mounted in said chucking jaws with parts thereof in aligned relation, tie member guides having spiral grooves at their ends adjacent the jaws, and feed means for rotating and advancing helical tie members through said guides and into engagement with the top and bottom end coils of the chucked springs.

20. In a machine of the class described, the combination with a work table, of chucking jaws adapted to support coiled springs with portions of their bottom coils in fixed relation, upper spring holding jaws engaging and supporting the upper end coils of springs mounted in said chucking jaws with parts thereof in aligned relation, and feed means for rotating and advancing helical tie members into engagement with the top and bottom end coils of the chucked springs, each feed means comprising a plurality of feed rollers having peripheral annular grooves therein, the grooves of said rolls being arranged in stepped relation, one of said rolls being adjustable relative to the others to facilitate the positioning of the work therein.

21. In a machine of the class described, the combination of work supporting means adapted to support springs to be connected, guide members having guide channels aligned with the aligned portions of the springs and having spiral grooves at their ends adjacent the springs and conical mouths at their opposite ends, and feed means positioned at opposite ends of the work table for rotating and advancing helical tie members through said guides and into engagement with the supported springs, each feed means comprising a plurality of feed rollers having peripheral annular grooves therein, the grooves of the rolls being arranged in stepped relation, one of the rolls being adjustable relative to the other to facilitate the positioning of the work therein.

22. In a machine of the class described, the combination of work supporting means adapted to support springs to be connected, guide members having guide channels aligned with the aligned portions of the springs and having spiral grooves only at their ends adjacent the springs and smooth surfaced conical mouths at their opposite ends, and feed means positioned at opposite ends of the work table for rotating and advancing helical tie members through said guides and into engagement with the supported springs.

23. In a machine of the class described, the combination with a work table, of work chucks adapted to support springs to be assembled, upper work holders mounted for swinging movement to and from the work chucks, means for adjustably supporting the upper work holders in position for facilitating the engagement of the work therewith and also in work clamping position, and feed means for rotating and advancing helical tie members into engagement with the springs mounted in the chucks.

24. In a machine of the class described, the combination of work chucks adapted to support rows of springs to be assembled, tie member guides operatively associated with said work chucks and having bore-like channels terminating at their ends adjacent the chucks in spiral grooves, and means for rotating and advancing helical tie members through said guides and into engagement with the aligned portions of the chucked springs, said feed means comprising reversible motors whereby the tie members may be rotated and advanced or retracted or stopped at any point in the feeding operation.

25. In a machine of the class described, the combination of work chucks adapted to support rows of springs to be assembled, tie member guides operatively associated with said work chucks and having smooth bore-like channels terminating only at their ends adjacent the chucks in spiral grooves, and means for rotating and advancing helical tie members through said guides and into engagement with the aligned portions of the chucked springs.

26. In a machine of the class described, the combination of lower chuck supports, one of which is adjustable to and from the other, inner chuck members mounted on said supports in opposed relation for adjustment relative to the inner edges of the supports, said chuck members having oppositely inclined work engaging faces provided with groove-like seats and inwardly inclined portions above the seats facilitating the engagement of the work therewith, outer chuck member supporting blocks adjustably mounted on said supports and having outer chuck jaws slidably mounted thereon and provided with springs acting to urge said outer chuck jaws yieldingly outward, said outer chuck jaws having under-cut seats and inwardly inclined face portions facilitating the engagement of the springs with said seats, upper jaw supports, one of which is adjustable to and from the other, upper work holders mounted on said supports for adjustment relative to the inner edges thereof and provided with downwardly facing work receiving grooves adapted to engage the upper end coils of springs arranged in said chucking jaws and having projecting parts adapted to rest on the upper end coils, and ejectors reciprocating in said chuck supports to engage the work adjacent said outer chuck jaws.

27. In a machine of the class described, the combination of lower chuck supports, one of which is adjustable to and from the other, inner chuck members mounted on said supports in opposed relation for adjustment relative to the inner edges of the supports, said chuck members having oppositely inclined work engaging faces provided with groove-like seats and inwardly inclined portions above the seats facilitating the engagement of the work therewith, outer chuck member supporting blocks adjustably mounted on said supports and having outer chuck jaws slidably mounted thereon and provided with springs acting to urge said outer chuck jaws yieldingly outward, said outer chuck jaws having under-cut seats and inwardly inclined face portions facilitating the engagement of the springs with said seats, upper jaw supports, one of which is adjustable to and from the other, and upper work holders mounted on said supports for adjustment relative to the inner edges thereof and provided with downwardly facing work receiving grooves adapted to engage the upper end coils of springs arranged in said chucking jaws and having projecting parts adapted to rest on the upper end coils.

28. In a machine of the class described, the combination of chuck supports, one of which is adjustable to and from the other, inner chuck members mounted on said supports in opposed relation for adjustment relative to the inner edges of the supports, said chuck members having oppositely inclined work engaging faces provided with groove-like seats and inwardly inclined portions above the seats facilitating the engagement of the work therewith, outer chuck member supporting blocks adjustably mounted on said supports and having outer chuck jaws slidably mounted thereon and provided with springs acting to urge said outer chuck jaws yieldingly outward, said outer chuck jaws having under-cut seats and inwardly inclined face portions facilitating the engagement of the springs with said seats, and ejectors reciprocating in said chuck supports to engage the work adjacent said outer chuck jaws.

29. In a machine of the class described, the combination of chuck supports, one of which is adjustable to and from the other, inner chuck members mounted on said supports in opposed relation for adjustment relative to the inner edges of the supports, said chuck members having oppositely inclined work engaging faces provided with groove-like seats and inwardly inclined portions above the seats facilitating the engagement of the work therewith, and outer chuck member supporting blocks adjustably mounted on said supports and having outer chuck jaws slidably mounted thereon and provided with springs acting to urge said outer chuck jaws yieldingly outward, said outer chuck jaws having under-cut seats and inwardly inclined face portions facilitating the engagement of the springs with said seats.

30. In a machine of the class described, the combination of lower chuck supports, inner chuck members mounted on said supports in opposed relation, outer chuck member supporting blocks mounted on said supports and having outer chuck jaws slidably mounted thereon and provided with springs acting to urge said outer chuck jaws yieldingly outward, upper jaw supports, upper work holders mounted on said supports and adapted to engage the upper end coils of springs arranged in said chucking jaws, and ejectors reciprocating in said chuck supports to engage the work adjacent said outer chuck jaws.

31. In a machine of the class described, the combination of lower chuck supports, inner chuck members mounted on said supports in opposed relation, outer chuck member supporting blocks mounted on said supports and having outer chuck jaws slidably mounted thereon and provided with springs acting to urge said outer chuck jaws yieldingly outward, upper jaw supports, and upper work holders mounted on said supports and adapted to engage the upper end coils of springs arranged in said chucking jaws.

32. In a machine of the class described, the combination of inner chuck members mounted in opposed relation and having oppositely inclined work engaging faces provided with groove-like seats and inwardly inclined portions above the seats facilitating the engagement of the work therewith, yieldingly supported outer chuck jaws having under-cut seats and inwardly inclined face portions facilitating the engagement of the springs with said seats, upper work holders provided with downwardly facing work receiving grooves adapted to engage the upper end coils of springs arranged in said chucking jaws, and ejectors reciprocating in said chuck supports to engage the work adjacent said outer chuck jaws.

33. In a machine of the class described, the combination of inner chuck members mounted in opposed relation and having oppositely inclined work engaging faces provided with groove-like seats and inwardly inclined portions above the seats facilitating the engagement of the work therewith, yieldingly supported outer chuck jaws having under-cut seats and inwardly inclined face portions facilitating the engagement of the springs with said seats, and ejectors reciprocating in said chuck supports to engage the work adjacent said outer chuck jaws.

34. In a machine of the class described, the combination of inner chuck members mounted in opposed relation and having oppositely inclined work engaging faces provided with groove-like seats and inwardly inclined portions above the seats facilitating the engagement of the work therewith, yieldingly supported outer chuck jaws having under-cut seats and inwardly inclined face portions facilitating the engagement of the springs with said seats, and upper work holders provided with downwardly facing work receiving grooves adapted to engage the upper end coils of springs arranged in said chucking jaws.

35. In a machine of the class described, the combination of inner chuck members mounted in opposed relation and having oppositely inclined work engaging faces provided with groove-like seats and inwardly inclined portions above the seats facilitating the engagement of the work therewith, and yieldingly supported outer chuck jaws having under-cut seats and inwardly inclined face portions facilitating the engagement of the springs with said seats.

36. In a machine of the class described, the combination of inner chuck members mounted in opposed relation and having oppositely inclined work engaging faces, yieldingly supported outer chuck jaws, upper work holders adapted to engage the upper end coils of springs arranged in said chucking jaws, and ejectors reciprocating in said chuck supports to engage the work adjacent said outer chuck jaws.

37. In a machine of the class described, the combination of inner chuck members mounted in opposed relation and having oppositely inclined work engaging faces, yieldingly supported outer chuck jaws, and ejectors reciprocating in said chuck supports to engage the work adjacent said outer chuck jaws.

38. In a machine of the class described, the combination of inner chuck members mounted in opposed relation and having oppositely inclined work engaging faces, yieldingly supported outer chuck jaws, and upper work holders adapted to engage the upper end coils of springs arranged in said chucking jaws.

39. In apparatus for assembling springs, means for supporting springs with portions thereof in contiguous relation, guide means about said contiguous portions, releasable expansion means for accurately positioning said springs, and means for weaving helicals about the contiguous portions of said springs.

40. In apparatus for assembling springs, means for supporting springs with portions of the springs in contiguous relation, guide means about said contiguous portions, expansion blocks slidably supported and adapted to be received within said springs, means for expanding said blocks to accurately position said springs, and means for weaving helicals about the contiguous portions of said springs.

LAWRENCE H. HEUER.